US009652986B2

(12) United States Patent
Belzner et al.

(10) Patent No.: US 9,652,986 B2
(45) Date of Patent: May 16, 2017

(54) METHOD FOR PROVIDING PARKING INFORMATION ON FREE PARKING SPACES

(71) Applicant: Bayerische Motoren Werke Aktiengesellschaft, Munich (DE)

(72) Inventors: Heidrun Belzner, Seefeld (DE); Ronald Kates, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 260 days.

(21) Appl. No.: 14/448,571

(22) Filed: Jul. 31, 2014

(65) Prior Publication Data

US 2014/0340242 A1 Nov. 20, 2014

Related U.S. Application Data

(63) Continuation of application No. PCT/EP2013/051130, filed on Jan. 22, 2013.

(30) Foreign Application Priority Data

Feb. 1, 2012 (DE) ........................ 10 2012 201 472

(51) Int. Cl.
*B60Q 1/48* (2006.01)
*G08G 1/14* (2006.01)

(52) U.S. Cl.
CPC ............... *G08G 1/14* (2013.01); *G08G 1/143* (2013.01); *G08G 1/144* (2013.01); *G08G 1/147* (2013.01); *G08G 1/148* (2013.01)

(58) Field of Classification Search
CPC .......... G08G 1/14; G08G 1/141; G08G 1/142; G08G 1/146; G08G 1/147; G08G 1/148
(Continued)

(56) References Cited

U.S. PATENT DOCUMENTS 6,927,700 B1 8/2005 Quinn
2007/0050240 A1* 3/2007 Belani ...................... G08G 1/14 705/13
(Continued)

FOREIGN PATENT DOCUMENTS

CN 101470966 A 7/2009
CN 101470967 A 7/2009
(Continued)

OTHER PUBLICATIONS

German language Search Report dated Nov. 22, 2012, with English translation (Ten (10) pages).
(Continued)

*Primary Examiner* — Joseph Feild
*Assistant Examiner* — Rufus Point
(74) *Attorney, Agent, or Firm* — Crowell & Moring LLP

(57) ABSTRACT

A method is provided for providing parking information regarding free parking spaces within at least one city block. The method provides for detecting information regarding available, free parking spaces, wherein a knowledge database with historical data is generated from the detected information. The historical data for specified city blocks and/or specified times or periods of time respectively comprise statistical data regarding free parking spaces. From the historical data and current information that are detected by vehicles in traffic for a first given point in time for a single or a plurality of selected city blocks, a probability distribution of free parking spaces to be expected for the single or the plurality of city blocks is determined. A visualization of the probability distribution is generated that represents the parking information regarding free parking spaces within the single or the plurality of city blocks.

17 Claims, 2 Drawing Sheets

(58) Field of Classification Search
USPC .................................................... 340/932.2
See application file for complete search history.

(56) References Cited

U.S. PATENT DOCUMENTS

| | | | | |
|---|---|---|---|---|
| 2008/0048885 | A1 | 2/2008 | Quinn | |
| 2009/0167565 | A1 | 7/2009 | Morimoto et al. | |
| 2009/0171567 | A1 | 7/2009 | Morimoto et al. | |
| 2012/0130872 | A1 * | 5/2012 | Baughman | G07B 15/02 705/32 |
| 2012/0161986 | A1 * | 6/2012 | Amir | G01C 21/3685 340/932.2 |
| 2012/0200430 | A1 * | 8/2012 | Spahl | G01C 21/3685 340/932.2 |
| 2014/0085112 | A1 * | 3/2014 | Gruteser | B60Q 9/004 340/932.2 |
| 2015/0123818 | A1 * | 5/2015 | Sellschopp | G01C 21/3484 340/932.2 |

FOREIGN PATENT DOCUMENTS

| | | | |
|---|---|---|---|
| DE | 10 2009 028 024 | A1 | 2/2011 |
| EP | 2 075 546 | A2 | 7/2009 |
| EP | 2 075 777 | A2 | 7/2009 |
| WO | WO 2010/081547 | A1 | 7/2010 |

OTHER PUBLICATIONS

International Search Report (PCT/ISA/210) dated Apr. 3, 2013, with English translation (Five (5) pages).

William Young (1988): A review of parking lot design models, Transport Reviews: A Transnational Transdisciplinary Journal, 8:2,161-181, http://www.tandfonline.com/doi/pdf/10.1080/01441648808716682, (Ten (10) pages).

Chinese Office Action issued in counterpart Chinese Application No. 201380013770.3 dated Apr. 19, 2016, with English translation (sixteen (16) pages).

Chinese-language Office Action issued in counterpart Chinese Application No. 201380013770.3 dated Aug. 24, 2015 with English translation (Eighteen (18) pages).

Chinese Office Action issued in Chinese counterpart application No. 201380013770.3 dated Sep. 26, 2016, with partial English translation (Fifteen (15) pages).

* cited by examiner

METHOD FOR PROVIDING PARKING INFORMATION ON FREE PARKING SPACES

CROSS REFERENCE TO RELATED APPLICATIONS

This application is a continuation of PCT International Application No. PCT/EP2013/051130, filed Jan. 22, 2013, which claims priority under 35 U.S.C. §119 from German Patent Application No. 10 2012 201 472.1, filed Feb. 1, 2012, the entire disclosures of which are herein expressly incorporated by reference.

BACKGROUND AND SUMMARY OF THE INVENTION

The invention relates to a method for providing parking information regarding free parking spaces within at least one city block.

Parking information regarding free parking spaces is used, for example, by parking guidance systems and/or navigation devices that a motor vehicle searching a parking space uses to navigate. Modern urban systems operate according to a simple principle. If the number of available parking spaces and the number of vehicles entering and exiting to and from them are known, the availability of free parking spaces can be easily established. By providing corresponding signage on access roads and dynamic update systems for parking information, vehicles can be navigated to free parking spaces. Limitations are created owing to the underlying principle itself, whereby it is necessary to require that any parking spaces are marked by clear delimitations and that the number of vehicles entering and exiting is always precisely controlled. Structural measures are needed to this end, such as, for example, gates and other access control systems.

Due to these limitations, vehicles can only be navigated to a small number of free parking spaces. Typically, only parking garages or fenced in parking facilities can be equipped with the necessary structural measures needed for integration in a parking guidance system. A by far greater number of parking spaces can be found alongside streets and roadways or in parking facilities where spaces are without clear demarcations; and these parking spaces are not taken into account.

When searching for an unoccupied parking spot particularly in urban and densely populated areas, being able to identity parking spaces alongside respective city streets is desirable. DE 10 2009 028 024 A1 teaches in this regard that information on available free parking spaces is matched to vehicle-specific data. As a result, parking spaces that are free are not being offered to a vehicle searching for a parking space, when said space is not of a sufficient size for such a vehicle. In addition, extra-large parking spaces or parking spaces that are arranged one after the other, for example, are identified as available not only to one but, depending on the size of the parked vehicles, possibly two vehicles. Used as parking exploration vehicles are, for example, vehicles that are employed in public transportation, such as, for example, busses or taxi cabs operating on a regular schedule and that are equipped with at least one sensor for detecting parking spaces. The sensor means therein can be based on optical and/or non-optical sensors.

Further, also known are community-based applications where, for example, the users of vehicles enter information into an app, when they leave a parking space. This information is then made available to other users of this service. Disadvantageously, the information regarding available parking spaces is only as good as the input information made available by users.

The described options suffer from the problem that any information regarding availability of an individual parking space is very fleeting; meaning, when a vehicle is looking for parking, in areas with a high volume of traffic, which is where parking information would be helpful, any free parking spaces that have just opened up are typically reoccupied within only a short amount of time.

Therefore, it is the object of the present invention to provide a better method for providing parking information identifying free parking spaces at least within one city block.

This task is achieved by a method, a computer program product, as well as a system for providing parking information as discussed herein.

The invention provides a method for providing parking information regarding free parking spaces at least within one city block. In particular, a method is provided that takes into account free parking spaces alongside streets and roadways.

The method provides for the detection of information regarding available, free, parking spaces, wherein the detected information is used to generate a knowledge database of historical data. The historical data for specified city blocks and/or specified times or time periods comprise, respectively, statistical data on free parking spaces. Information that resides in the knowledge database specifies, for example, that in a given street with a total of x available parking spaces, y parking spaces are on average available at a certain time or during a particular time period. However, on the other hand, at a different point-in-time or during a different time period, only $z<y$ free parking spaces are available alongside the same street. Correspondingly, the historical knowledge database thus comprises, on the one hand, information regarding which parking spaces can be utilized, as a matter of principle, as parking spaces (so-called valid parking spaces) and, on the other hand, information regarding the average number of unoccupied parking spaces at certain times.

In a further step, the historical data and current information, as detected at a first given point-in-time for a single or a plurality of selected city blocks, are entered into a probability distribution of free parking spaces to be expected for the single or the plurality of selected city blocks. A central computer preferably establishes the probability distribution. The current information regarding available, free parking spaces is transmitted by vehicles in traffic or by stationary sensors within the related city block to the central computer.

Finally, a visualization of the probability distribution is generated by which the parking information that is related to free parking spaces within the selected city blocks is represented. The visualization of the probability distribution can be achieved by the central computer, wherein the result of the visualization could then serve as a basis for a recommendation as to a suggested route that the vehicle looking for parking should take.

Utilizing a probability distribution of free parking spaces within a single or a plurality of city blocks allows for providing the vehicle that is looking for a parking space with more precise information at the point-in-time when said vehicle is in fact searching for a parking space.

An expedient embodiment provides for the detection of the information regarding available, free parking spaces by metrological measures, and wherein these values are being taken by vehicles that are in traffic. To this end, the use of the sensor technology that is available already in motor vehicles and that can be based on optical and/or non-optical sensors is possible. The use of cameras is particularly preferred. Particularly the cameras on a vehicle having a lateral orientation are contemplated for this purpose, which are, for example, provided on the vehicle as a support modality for maneuvering into a parking space while helping to avoid contact with obstacles. Similarly, sensors can be used that are originally intended, for example, as a lane-changing assistant and that assist the driver in leaving or changing a street lane. Sensors of this kind can be based on radar or on other non-optical technology, for example.

In one expedient embodiment, an edge of the street or roadway is detected by a camera on the vehicle, producing a sequence of images that is analyzed by a computer of said vehicle in order to identify free parking spaces alongside the detected edge of the street. It is expediently provided therein that only valid parking spaces are included in the probability calculation. A valid parking space is understood as a parking space where the placement of a motor vehicle is regularly allowed. While valid parking spaces are, for example, entry points to cross-sections, fire engine access areas, and the like, a plausibility assessment must determine by use of image processing and additional sensors the validity, such as a digital map, and wherein free parking spaces are automatically detected and assessed for their plausible use as a parking space by the moving vehicle. For example, a laterally placed camera on vehicles can be used for this purpose.

In a further expedient embodiment, the information regarding available, free, parking spaces is metrologically detected by sensors that are disposed alongside the city blocks. Such sensors are known in the art; for example, they are used in monitoring applications for parking spaces in parking garages or other delimited parking facilities.

It is further possible to envision that the information regarding available, free parking is generated manually by user inputs into an end device (e.g., Smartphone, laptop computer, tablet computer, etc., but also via the user interface of a vehicle). For example, special apps can be provided for this purpose through which users can report free parking spaces. A corresponding user entry can be input, for example, at the time when the user maneuvers his or her vehicle out of a parking space. The corresponding information is then taken into account in the parking computer as mentioned at the outset of the present comments in the context of processing the current information.

The term “current information” always refers to a certain point-in-time in the present. Current information is not only used for combining the same with historical data; furthermore, such information is simultaneously also always added to the historical data, such that the historical data comprise the detected data since the beginning date of the creation of a recorded volume of free parking spaces within certain city blocks at certain points-in-time.

The information regarding available, free parking spaces are expediently transmitted to the central computer that generates and/or manages the knowledge database. Any such central computer can be administered, for example, by a service provider offering parking information. Any such service provider can be, for example, a vehicle manufacturer who thus causes information regarding free parking spaces to be processed in the context of his navigation systems for route and travel information.

A further embodiment provides that first information regarding the maneuvering action of a motor vehicle in an effort of entering or exiting a parking space is detected as information, wherein, a maneuvering rate for exiting a parking space is determined based on the standing times between the maneuvering action for entering and exiting a parking space. The rate of the maneuvering action for exiting a parking space can be advantageously processed in a queueing model, whereby it is also possible to arrive at a prognosis regarding the probability change at a later point-in-time. Such a later point-in-time could be, for example, the time of arrival at a certain city block in the context of a calculated navigational route. As a matter of principle, a prognosis can already be based on the historical probability distribution. However, the more current the used data, the better is the quality of the prognosis.

It can be further envisioned, that second information regarding the duration/rate of searching for a parking spot is detected as further information from motor vehicles looking for parking, in that, following detection of a maneuvering process by a vehicle for entering a parking space, the preceding location coordinates of the movement of the vehicle and the respective time stamp allocated to the respective location coordinates, as well are momentary velocities, are analyzed. Similarly to the maneuvering rate for exiting a parking space, the duration/rate of searching for a parking spot is used in the context of a queueing model for adapting the probability model at a later point-in-time.

To determine the probability distribution of free parking spaces to be expected, in step b), the historical data and the current information are expediently processed using Bayes’ rule. Bayes’ rule allows for a data fusion of historical data and current information in order to determine the probability distribution.

According to a further embodiment, a prognosis of the change of the probability distribution of free parking spaces to be expected is determined at a second given point-in-time, and wherein the second point-in-time follows after the first point-in-time, wherein the rate of maneuvering in an effort of exiting a parking space and the duration/rate of searching for a parking spot are processed in order to determine the prognosis. The second point-in-time can comprise an arrival time at a destination area that is established based on a navigational route and comprises the specified city blocks.

The prognosis can be achieved by modelling the probability distribution as determined at the first given point-in-time by the assumed transition to the expected state of the probability distribution, wherein the expected state corresponds to a state that matches the historical data. The prognosis is generated by use of the Erlang loss queueing model, for example.

The previously described information—maneuvering rate for exiting a parking space, duration/rate of searching for a parking spot—are used to provide a learning curve for the historical knowledge database, just like the current information regarding free parking spaces. The data fusion algorithm based on Bayes’ rule thus takes into account the historical database as well as current information, thereby yielding a statement of good quality regarding the probability distribution of the free parking spaces that are to be expected, as well as regarding the quality of the estimation at the point-in-time of the determination thereof. In addition, the changes of the probability distribution over time, particularly the increase in uncertainty, are forecast assisted by an estimation of the traffic looking for parking and/or the maneuvering frequency for exiting a parking space. With the aid of this information, it is then possible to display a map containing the corresponding, optimized probabilities. The same can be offered for optimal search routes or for a decision-making step as to where parking spaces are best found. For example, it is possible to answer the question as to whether it is possible at all to find a route to a destination that is a likely available, free parking space.

An advantage of the described method lies in the fact that modern series produced motor vehicles are able to detect free parking spaces alongside streets and roadways automatically and without additional hardware. Sensors that are utilized by the vehicles anyway are used for this purpose. This information is then transmitted to a central computer, wherein this step can be implemented via telematics modules that are available in many motor vehicles anyway, and without causing additional expenditure. By the previously described fusion of historical and current data in the central computer, it is then possible to accumulate historical knowledge with regard to the probability of finding a parking space and the duration of the search for such a space. In addition, it is possible to incorporate attributes of the digital map related to parking spaces in the learning curve, which is why a detailed map is not required at the time of market introduction. Over time, the map can be compiled based on the better and better evolving historical data.

The invention further provides a computer program product that can be loaded directly into the internal memory of a digital computer or computer system, comprising software code sections by which it is possible to implement the steps according to the invention when the product is running on the computer or computer system.

Finally, the invention includes a system that provides parking information regarding free parking spaces within at least one city block. The system comprises as follows:

a) a first unit for detecting the information regarding available, free parking spaces that is configured so as to generate a knowledge database with historical data based on this detected information, wherein the historical data comprise respective statistical data regarding free parking spaces for specified city blocks and/or specified times or time periods;

b) a second unit for determining a probability distribution of free parking spaces to be expected for the single or plurality of selected city blocks based on the historical data and current information that are available at a first given point-in-time for a single or a plurality of selected city blocks from vehicles that are in traffic; and c) a third unit for generating a visualization of the probability distribution that represents the parking information regarding free parking spaces within the single or the plurality of the selected city blocks.

The system has the same advantages as described previously in connection with the method according to the invention. Moreover, the system can comprise further means for implementing preferred embodiments of the method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
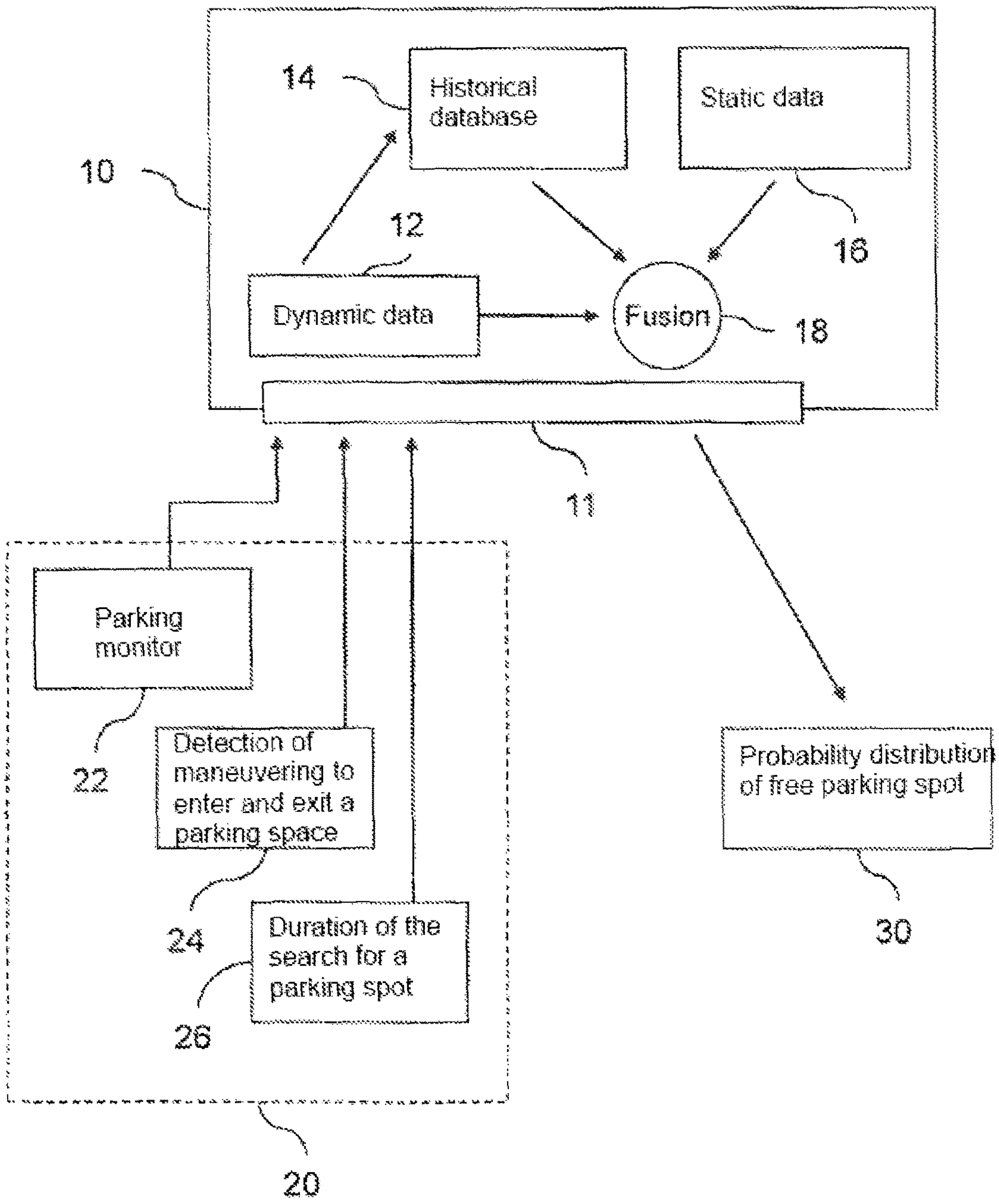
FIG. 1 is a schematic block diagram representation of a system for implementing the method according to an embodiment of the invention.

FIG. 1 depicts a schematic representation of a system according to an embodiment of the invention for providing parking information regarding free parking spaces within a single or a plurality of city blocks. The system includes a central computer 10 that can be constituted of one or several computers. The central computer 10 is administered, for example, by a service provider that provides parking information. For example, the service provider can be a motor vehicle manufacturer.

The central computer 10 includes a communication interface 11 for receiving information regarding available, free parking spaces, as well as for sending information that represent a probability distribution of free parking spaces that are to be expected for a certain city block. The task of the central computer 10 consists in processing information on available, free parking spaces that is transmitted to the central computer by vehicles that are in traffic, but also by stationary installed sensor units.

The totality of the information regarding available, free parking spaces or data for obtaining said information is designated by reference numeral 20 in FIG. 1. The information that is described below in further detail is compiled by a service 22 designated as a "parking monitor", a maneuvering detection service for entering and exiting a parking space 24 and a service for providing a duration of the search for a parking spot 26. The respective information can be transferred to the central computer 10 in a completely processed format. In the same way, it is possible for the processing step to be handled by the central computer 10, whereby the vehicles and/or sensors that supply the information must only provide raw data and/or pre-processed data.

The information that is provided to the central computer 10 constitutes current information, taken at the time when such information is provided and representing a situation regarding available, free parking spaces at the current point-in-time for a single or a plurality of selected city blocks. The current data are processed inside the central computer 10 in order to obtain dynamic data 12. A learning process is used to generate, based on the dynamic data 12, which have been received since points in the past and until the current point-in-time, from the central computer 10, a historical database 14. The presently provided current information is also processed inside and/or for the historical database. The information that is contained in the historical database 14 is merged with the dynamic data 12 in a manner that will be described in further detail below (reference numeral 18), wherein, as a result of the data fusion, there is obtained a probability distribution of the free parking spaces to be expected for the single or the plurality of city blocks. In the context of the fusion, further statistical data 16 can be taken into account that relate to information involving the total number of parking spaces as well as non-valid parking spaces, regarding the size of the parking spaces or the type of the parking facility management, etc. To be able to process the probability distribution of free parking spaces to be expected for the targeted city blocks, a visualization of the probability distribution is, furthermore, generated that represents and/or depicts the parking information regarding the free parking spaces in the involved city blocks. The visualization can be achieved by the computer unit 10 itself or, however, by a computer and/or a vehicle to which the information as represented in the probability distribution were transmitted. FIG. 1 indicates the probability distribution of free parking spaces by the use of the reference numeral 30.

The parking monitor 22 serves to detect current data regarding free and/or occupied parking spaces in a street or along roadway. Preferably, the detection occurs by means of vehicles that are in traffic and that detect the edge alongside the street by various sensors. The detection of the edge of the street or roadway is preferably achieved by one or several camera(s), and wherein the image sequence(s) generated by the one or several camera(s) is (are) analyzed by an image processor in order to detect parking spaces and conduct plausibility checks automatically, while moving along the traveled street. A plausibility check therein refers to an examination for ascertaining as to whether a spot can in fact be evaluated as a parking space or not. In the context of a plausibility check of valid parking spaces (meaning that are in fact available for parking), the distances and/or sizes of said spaces are determined as well. Aside from the collection of information as provided by vehicles that are in traffic, manually input user information, for example, into the end device therein specifying free parking spaces, is also possible, as well as information from stationary sensors, and they are transmitted to the computing unit 10.

The information regarding a system that detects maneuvering action for the purpose of entering and exiting a parking space (reference numeral 24) can optionally be detected automatically by vehicle sensors and/or manually by user inputs into a corresponding user end device. A maneuvering process for exiting from a parking space can be detected, for example, by the start-up of the vehicle engine, detection of the current location, as well as the evaluation of steering movements. In the same manner, the driver could transmit information to the central computer 10 while he/she maneuvers in order to exit a parking space by inputting the corresponding information into a man-to-machine interface (via an interface inside the vehicle or a portable end device) regarding the process of leaving a parking space. Correspondingly, these steps could be also implemented for the reverse maneuvering process while entering a parking space. When the points-in-time of maneuvering for entering a parking space and for exiting a parking space of the respective vehicle are known, it is possible to determine a standing time and, based thereupon, the so-called rate of maneuvering for exiting a parking space $\mu$. The rate of maneuvering for exiting a parking space $\mu$ is processed in the context of a queue, as described in further detail below, thus further improving the precision of the probability distribution.

Another input parameter for the queueing model represents the duration of the search for a parking spot $\lambda$, which is also designated as the rate of looking for a parking spot. The same can be determined based on detected location coordinates of a vehicle. The geographic coordinates of the movement of a vehicle can be detected, for example, based on the GPS receiver that is integrated in the vehicle. The coordinates, which are referred to as positions, are saved in specified intervals and stored as so-called beads in a ring memory of the vehicle. When it is determined that a vehicle was maneuvered in order to enter a parking space, the content of the ring memory is analyzed to assign the measure for the duration of the search for a parking spot $\lambda$ as well as the probability of success of the search for parking to a parking search process. The related necessary computing processes can be implemented in a computing unit of the vehicle itself or, however, by the computing unit 10, when the corresponding information is transmitted with the location coordinates to the computing unit 10.

To assign the duration of the search for a parking spot $\lambda$ of a motor vehicle, the sequence of positions inside the ring memory is analyzed as follows. Each bead is given a position $x_i$, $y_i$ as well as a time stamp $t_i$ and a current velocity $v_i$. Therein, $i=1, \ldots, N$, wherein $t_N$ designates the point-in-time when the vehicles is maneuvered in order to enter a parking space. Now, there occurs a reverse search from point-in-time N for a maximum sequence of "beads", such that the sequence in total is considered a parking search sequence. The known friends-2-friends process can be employed for this purpose. Used therein is a search radius, and such beads are combined that have the property of their velocity being below a specified threshold value and that they are at a distance relative to each other within the search radius. Only one geometric calculation is necessary therein, which is based on the available location positions.

As outlined in the introduction, the aforementioned information is transmitted to the central computer 10 and used, on the one hand, for the learning curve of the historical database 16. On the other hand, the current data flow into the data fusion algorithm 18. The known mechanism of Baynes' rule is utilized in the determination of the probability distribution by use of the fusion algorithm. The data of the historical database 16 as well as the dynamic, current data 12 are taken into consideration. As a result of the fusion, a probability distribution of the free parking spaces to be expected is obtained. Moreover, it is possible to arrive at a statement regarding the quality of this estimation at the time of the detection.

In addition, a prognosis of the course that the change of the probability distributions will take over time is obtained, particularly the enlargement of an uncertainty, using the estimate of the duration of the search for a parking spot $\lambda$ as well as the rate of maneuvering in order to exit a parking space $\mu$, using a queueing model. This allows for arriving at a prognosis of the change of the probability distribution of free parking spaces to be expected at a later point-in-time, as compared to what is detected at the current point-in-time. In determining the prognosis, as explained previously, the rate of maneuvering in order to exit a parking space $\mu$ and the duration of the search for a parking spot $\lambda$ are processed. The later point-in-time can be, for example, the time of arrival at a destination, comprising the single or plurality of the city blocks as established by a route navigation system. The prognosis is obtained by modeling the probability distribution as determined at the first given point-in-time by the presumed transition to an expected state of the probability distribution, wherein the expected state corresponds to a state that is matched to the historical data at a later, second point-in-time.

This way, it is possible to determine, for example, if it is possible to find a travel route to a probably available, free parking space at the destination following the navigation of a route.

The method steps for determining the probability distribution of free parking spaces that are to be expected for a certain city block will be explained in further detail.

The goal is a prognosis as to the probability distribution of free parking spaces within a city block that could serve as a basis for a recommendation within the context of a guided route inside the vehicle. Historical data are used therein as input data; further used, if available, are current information and/or data regarding free parking spaces. The information relate to the number of occupied and/or unoccupied (free) parking spaces.

The method utilizes a statistical model and an algorithm for estimating the parameters of the probability distribution of free parking spaces on the basis of historical data, when current data are available with a comparable time stamp and with otherwise comparable factors of influence. The fusion algorithm is based on Bayes' theorem.

Bayes' theorem can be improved in term of the precision thereof by a so-called birth-and-death Markov process model (also known as the Erlang loss model) and algorithms for estimating the development of the probability distributions for free parking spaces over time, as well as the states of equilibrium. The transition from a directly observed state to a historical state is modeled with the algorithm for the development over time. The equilibrium solutions can also be used to describe situations with considerable traffic searching for parking.

A needed parameter for the Erlang loss model is, inter alia, the duration of the search for a parking spot, which can be determined using an algorithm for estimating a distance of the search for parking and a duration of the search for a parking spot λ of so-called "bead chains", meaning time series of local Cartesian coordinates of a vehicle that found a parking space. A ring memory for the "beads" is used for this purpose. The method supplies an estimation of the loss likelihood that is necessary for the estimation of the so-called "Erlang factor". The same, on the other hand, is utilized for the model of the development of the probability distributions over time. If no current data can be gathered regarding the distance of the search for parking and the duration of the search for a parking spot, the use of statistical collections and studies as a basis is alternately also possible. However, the model takes into account the uncertainty of the related conclusiveness.

In the optimum embodiment of the method, the method then envisions a transition between the points-in-time immediately after an observation until "relaxation" to a state that corresponds to the historical model. The transition rate depends on the traffic looking for parking and/or the rate of maneuvering for exiting a parking space μ. Data regarding the duration of the search for a parking spot and/or the distance of the search for parking, data regarding parking duration, data regarding the maneuvering action for entering and exiting a parking space, are taken into account.

Regarding the current information, for the input data, it is assumed that a number f of free parking spaces from n valid parking spaces ($f \leq n$) is observed within a city block. The number of parking spaces observed as "occupied" (but valid) parking spaces is therefore $b=n-f$. Below, current information will also be referred to as observations.

Figure 2:
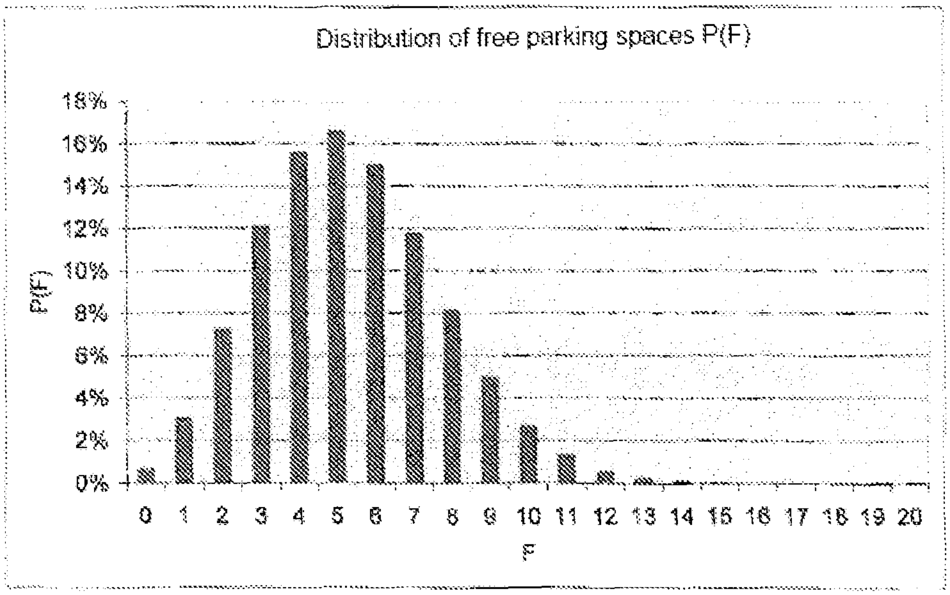
FIG. 2 is a graph of the result of the probability distribution of free parking spaces to be expected for the single or the plurality of the selected city blocks.

The prognosis of the probability distribution P(F) of free parking spaces F, as represented in an exemplary manner in FIG. 2, considers the fact that, on the one hand, the observation per se suffers from a level of uncertainty and, on the other hand, maneuvering processes for entering and exiting a parking space are possible between the time of the observation and the time of the arrival of the vehicle in question. The amount of time that passes between the time of observation and the anticipated arrival of the vehicle that is looking for parking is defined as a "prognostic horizon".

Each parking space that is observed as "free" is assigned a probability $\rho_f$ for expressing the fact that it will remain free. When the prognostic horizon is small, typically, $\rho_f$ is barely less than 1. For the parking spaces that are observed as "occupied" (but classified as valid), it is also assumed that a probability $\rho_b$ can be assigned to capture the fact that it will have become free (again). When the prognostic horizon is small, typically, $\rho_b$ is barely greater than 0. The two probabilities express the uncertainty in the context of detection, as well as the influence of other traffic that is looking for parking.

In this context, the fact must be taken into account that $\rho_f+\rho_b \neq 1$. For example, if the incidence of maneuvering for the purpose of exiting a parking space predominates, the increase of $\rho_b$ could be faster than the decrease of $\rho_f$. With a longer prognostic horizon, the importance of observation decreases; both probabilities then approach the historical distribution, insofar as it is possible to estimate the same.

In the prognosis method that is used according to the invention, utilizing historic observation, the case of a single historical observation is considered first. If K are historical observations (k=1, 2, . . . ) of $f_k$ free parking spaces from n valid parking spaces, they are defined as follows:

$$b_k = n - f_k \tag{1}$$

$$\alpha = 1 + \sum_{k=1}^{K} f_k \tag{2}$$

$$\beta = 1 + \sum_{k=1}^{K} b_k \tag{3}$$

$$N = nK \tag{4}$$

Under the assumptions, as explained in further detail below, the model for the probability distribution of free parking spaces assumes a binomial distribution with a probability parameter of ρ. The so-called beta distribution g(q;α;β) is known as a conjugated a priori distribution for the estimation of the parameters ρ from the likelihood function [http://de.wikipedia.org/wiki/Betaverteilung; in the wikipedia notation, g corresponds to f]. It expresses the probability g that the parameter ρ will take the value q. Herein, (α.β) are so-called hyperparameters of the conjugated a priori distribution.

Assuming a model of a binomial distribution with a fixed parameter ρ for the distribution density regarding the number f of free parking spaces as a function of the parameter ρ, the probability density P results $$P(f) = \binom{n}{f}(p)^n(1-p)^{n-f} \tag{5}$$

However, according to the beta distribution, due to the fact that ρ itself suffers from uncertainty, P(f) is integrated via the a priori distribution.

$$P(f;\alpha,\beta) = \int_0^1 \binom{n}{f}(p)^n(1-p)^{n-f}\,dg(p;\alpha,\beta) \tag{6}$$

The model of the binomial distribution describes the case of a relatively small amount of traffic looking for parking (in comparison to 1/parking duration). If this condition is regularly violated, high percentages of occupied parking spaces are frequently observed.

An improved prognosis results, when a queueing model according to "Erlang-loss (M/M/s/s)" is considered. The behavior of the system immediately after an observation is modeled as a transition or "relaxation" of the expected state to a state corresponding to the historical data. The transitional rate depends on the traffic looking for parking and the duration for finding parking (and/or the rate of maneuvering for exiting parking spaces μ). The Erlang loss model is suitable for the description of historical data with a high incidence of traffic searching for parking and/or high occupancy as well as generally for modeling the "relaxation". The same describes queues where any access to an occupied resource results in an immediate abort. During the search for parking within a city block, this is the case, when all parking spaces have already been occupied and the driver does not return. The model is extensively documented in the literature and is presently only summarized, as seen below.

The model can be viewed as a "birth-and-death Markov process." Occupancy occurs with a rate looking for parking λ(t), and maneuvering processes for exiting a parking space occur only for each individual parking space at a rate of μ(t)=1/h(t), wherein h(t) is a measure for the parking duration. Initially, it is assumed that both processes occur with an exponential distribution.

A city block has s available parking spaces, and no queues are formed. If a vehicle is looking for parking, and if there is a free space, the same takes this space. The transition probabilities therefore satisfy the following equations:

$$\frac{dP_j}{dt} = \lambda P_{j-1} + (j+1)\mu P_{j+1} - (\lambda + j\mu)P_j,\ \text{if}\ 0 < j < s \tag{7}$$

$$\frac{dP_0}{dt} = \mu P_1 - \lambda P_0,\ \text{if}\ j = 0 \tag{8}$$

$$\frac{dP_s}{dt} = \lambda P_{s-1} - s\mu P_s,\ \text{if}\ j = s \tag{9}$$

Further defined is the parameter ("traffic intensity" or load per server)

$$\rho \equiv \frac{\lambda}{s\mu} \tag{10}$$

space are at equilibrium, the stationary solutions of equation (7) are considered. They meet $$\lambda P_j = (j+1)\mu P_{j+1},\ j = 0, 1, 2, \ldots, s-1 \tag{11}$$

or $$P_{j+1} = \frac{\lambda}{(j+1)\mu}P_j,\ j = 0, 1, 2, \ldots, s-1$$

Resulting in the probabilities:

$$P_j = \frac{(\lambda/\mu)^j/j!}{\sum_{k=0}^{s}(\lambda/\mu)^k/k!},\ j = 0, 1, 2, \ldots, s. \tag{12}$$

The probability that all parking spaces are occupied and that the vehicle drives away is $$P_s = \frac{(\lambda/\mu)^s/s!}{\sum_{k=0}^{s}(\lambda/\mu)^k/k!} \tag{13}$$

The equation (10) is known as the "Erlang-B formula".

Using the following method, it is possible to obtain an estimation of the rate looking for parking λ(t). First, based on observations of processes maneuvering to enter and exit parking spaces, an estimation as to the historical parking duration h(t) is obtained, and therefore the rate of maneuvering for exiting parking spaces μ(t)=1/h(t). Based on the estimated distance traversed searching for parking (see description below), a measure Z is estimated for the total number of all valid parking spaces that were checked during the search. Therefore, a loss-probability L can be directly estimated:

$$L=1-S/Z \tag{14}$$

With $$P_s=1-L \tag{15}$$

s=number of valid parking spaces within a city block) it is possible to estimate the ratio $$\text{Erlang}=\lambda/\mu\square. \tag{16}$$

Using the Erlang factor "Erlang" and h(t), it is possible to calculate an estimated rate of the search for parking λ(t).

The individual estimations of λ(t) can randomly differ. To obtain a parameter value for the rate of the search for parking in the context of the solution of the transition equations 7 to 9 (transition to equilibrium), a preferred embodiment of the invention can provide for the use of the following method.

First, a table is compiled that allows for drawing conclusions as to a value ρ from repeated measurements of Z: to this end, a preferred embodiment provides that, with the assistance of the Monte Carlo method, which is known to the person skilled in the art, and using repeatedly generated implementations of the equations 7 to 10 at specified different sequences of ρ, any desired number (preferably: 10,000) N-tuple [ρ(i), Z(i)] are generated and divided in sub-groups regarding ρ. The parameters of a suitable probability distribution are determined for each sub-group, using familiar methods that are well known to the person skilled in the art, for example the maximum likelihood method, with maximum a posteriori (MAP) method or the method of moments. In a preferred embodiment, this is an exponential distribution characterized by a parameter alpha. This way, there results an assignment ρ(alpha) that is stored as a table in one preferred application. In further embodiments, the distribution can be characterized in a similar manner by a plurality of parameters, whereby ρ can be obtained by assigning these parameters.

Regarding the application (parameter value for the solution of the transition equations 7 to 9), the estimated values of h(t) are calculated for each of the repeated samplings Z(i) and assigned to the time stamp (the time of day and the day of the week are expressed by the time stamp). Correspondingly, the values (N-tuple) of the shape [t, h(t), Z(i)] are available. The N-tuple data are assigned to sub-groups regarding intervals of t (approximately hourly and by day of the week). The parameters for each sub-group of a suitable probability distribution are determined with the assistance of a familiar method that is well known to the person skilled in the art. One preferred embodiment envisions an exponential distribution that is completely characterized by one parameter (presently referred to as alpha). In further embodiments, the distribution can be characterized by a plurality of parameters.

The thus obtained parameter values are compared to the previously described table ρ(alpha) that assigns to each value of the parameters (approximately alpha) a corresponding value ρ. The parameter values for the rate of the search for parking can be thus obtained in the context of the solution of the transitional equations 7 to 9.

The thus obtained parameter values describe the "historical" empirical values of parameters of the equations 7 to 10. In a further embodiment of the invention, current values can also be estimated in that currently detected Z values (approximately the last hour) of a plurality of adjacent city blocks are combined and assigned to a ρ value as described previously.

The fusion of current observations occurs with historical distributions at non-stationary states. If f free parking spaces are observed at a point-in-time $t_0$, we rely on the above modeling assumptions. From f parking spaces that were originally observed as free, F1 are (still) free relative to the prognostic horizon. From b (b=n−f) parking spaces originally classified as occupied, F2 have become free (again) relative to the prognostic horizon F2. Occupations occur with a rate of the search for parking λ(t) (total), and maneuvering processes for exiting a parking space occur at a rate (per parking space) of μ(t)=1/h(t). The process as described below can also be used to obtain the order of magnitude Z.

The determination of a distance of the search for parking and duration of the search for a parking spot from bead chains is achieved using the algorithm as described below. A successful search for a parking space is observed, wherein it is assumed that a bead chain that takes the following form is available:

$$\{t_j,x_j,y_j\},j=0,N \tag{17}$$

with ascending time stamps $$t_{j+1}<t_j j=0,N-1 \tag{18}$$

The coordinates $\{x_j, y_i\}$ are local Cartesian coordinates, such as from GPS signals. For the application, it is assumed that the imprecisions are normally distributed, with a zero mean, and that the standard deviation is limited by a known upper limit ϵ (approximately 10 meters). This kind of bead chain can be provided by a ring memory of size N. The number of beads N is defined by the memory space available for this purpose. Maneuvering that results in "parked in a parking spot" correspondingly matches the bead $$\{t_N,x_N,y_j\} \tag{19}$$

In addition, a normal search radius $R_s$ and an extended search radius $R_E$ are specified, e.g. with $R_S$=200 meters $R_E$=500 meters.

In addition, a typical minimum speed for areas with dense traffic $V_{urban}$ is provided intended to apply for urban environments:

$$V_{urban}=2 \text{ meters/sec.} \tag{21}$$

To be able to better distinguish distances of the search for parking from routes to a destination, an efficiency factor $F_{eff}$ is defined:

$$F_{eff}=4 \tag{22}$$

To assign the distance of the search for parking and the duration of the search for a parking spot, first, the Euclidean distance for each bead relative to the parking space is formed:

| | |
|---|---|
| All beads | For j = 0, N−1 |
| Forming Euclidean distances to the parking space | $r_j = E[\{x_j,y_j\},\{x_N,y_N\}]$ |

Next, a search is done for the two search radii $R=R_E$, $R=R_S$ until a bead (index f) with a distance relative to the parking space $r_j<R$ is found.

| | |
|---|---|
| Both search radii | For R = $R_E$, R = $R_S$ {begin loop |
| All beads | For j = 0, N − 1, {begin loop |
| Forming Euclidean distances to parking space: | IF(R > $r_j$).THEN |
| | J = j |
| | EXIT |
| | } |
| | } |

It is possible for $J_E$=0; meaning the total chain is within the extended search radius $R_E$, or even within the normal search radius $R_S$. If this occurs regularly, the use of a larger ring memory is recommended. The indexes $J_S$ and $J_E$ are now available, and therefore the values $\{t_j, x_j, y_j\}$ for $j=J_S$ and $j=J_E$, approximately $t_{jE}$, etc.

To select one of the two search radii, the following is defined and calculated:

$$\delta = R_R - R_S \tag{23}$$

$$V_{eff} = \frac{\delta}{t_{J_E} - t_{J_S}} \tag{24}$$

$$\Delta = E[\{x_{J_S}, y_{J_S}\}, \{x_{J_E}, y_{J_E}\}] \tag{25}$$

$$\langle V \rangle = \frac{\Delta}{(t_{J_E} - t_{J_S})} \tag{26}$$

If $V_{eff}<V_{urban}$ AND $(V)>F_{eff}*V_{urban}$, the extended search radius $R=R_E$ and the index $J=J_E$ are to be used; otherwise the normal search radius $R=R_S$ and the index $J=J_S$. The intention of this decision rule is a modeling concept: an extended search is assumed, when the vehicle, despite typical urban driving speed, approaches the final parking space only insubstantially.

The following definition is provided to determine the duration of the search for a parking spot:

$$T=t_j-t_N \tag{27}$$

The notation $Ma[\{x_1, y_1\}, \{x_2, y_2\}]$ designates the traveled distance between two points $\{x_1, y_1\}$ and $\{x_2, y_2\}$. Thus, the distance of the search for parking is defined as follows:

$$X = \sum_{j=J}^{j=N} Ma[\{x_j, y_j\}, \{x_{j-1}, y_{j-1}\}] \tag{28}$$

The assignment of the number Z of searched parking spaces is a function of the quality of the available information. When the number of valid parking spaces along the distance of the search for parking is available, $$z(j)=\text{number of valid parking spaces between bead } j \text{ and bead } j+1. \tag{29}$$

The result is:

$$Z = \sum_{J}^{N-1} z(j) \tag{30}$$

Typically, this requires at least one map matching and one access to a historical database.

If no estimation of the number of valid parking spaces along the distance of the search for parking is available, using formula (28), it is nevertheless possible to arrive at an estimated value for the number of searched parking spaces. To this end, specified information regarding the parking space density d (number of valid parking spaces per km) is needed. In this case, there results (because X from formula (28) is measured in meters)

$$Z=dX/1000 \tag{31}$$

If a distance-dependent estimation of ρ is available, it is possible to generalize this formula, in that the respective distance-dependent estimate of the local parking space density is used instead of d.

LIST OF REFERENCE NUMERALS

10 Central computer
11 Interface
12 Dynamic data
14 Historical database
16 Static data
18 Fusion
20 Information/data regarding available, free parking spaces
22 Parking monitor
24 Maneuvering detection means for entering and exiting a parking space
26 Duration of the search for a parking spot
30 Probability distribution The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing parking information regarding free parking spaces within at least a single city block, the method comprising the acts of:

receiving current information regarding available, free parking spaces, wherein a knowledge database with historical data is generated from the information, wherein the historical data respectively comprise statistical data regarding free parking spaces for specified city blocks and/or specified times or periods of time;

fusing the historical data and the current information at a first given point-in-time for at least one selected city block to form fused data, updating, independently from said fusing, the historical data in the knowledge database with said current information;

determining a probability distribution of the free parking spaces to be expected for the at least one selected city block based on the fused data; and generating a visualization of the probability distribution that represents the parking information regarding free parking spaces in the at least one selected city block.

2. The method according to claim 1, wherein the current information regarding available, free parking spaces is metrologically detected by vehicles that are in traffic.

3. The method according to claim 2, wherein an edge area alongside a street or roadway is detected by vehicle cameras and an image sequence is generated that is analyzed by a vehicle computer in order to identify free parking spaces alongside the detected edge areas of the street or roadway.

4. The method according to claim 1, wherein the current information regarding available, free parking spaces is detected by sensors that are arranged alongside the city blocks.

5. The method according to claim 1, wherein the current information regarding available, free parking spaces is generated manually by input in an end device.

6. The method according to claim 2, wherein the current information regarding available, free parking spaces is transmitted to a central computer that generates the knowledge database.

7. The method according to claim 1, wherein fusing the historical data and the current information comprises fusing the historical data and the current information using Bayes' rule.

8. The method according to claim 1, wherein a prognosis of the change of the probability distribution of parking spaces to be expected for a second given point-in-time is determined, wherein the second point-in-time follows after the first given point-in-time, wherein the rate of maneuvering for exiting a parking space (u) and the duration of the search for a parking spot/rate Q are processed to determine the prognosis.

9. The method according to claim 8, wherein the second point-in-time is an arrival time in a destination area that is determined by route navigation comprising the single or the plurality of the specified city blocks.

10. The method according to claim 9, wherein the prognosis is carried out by modeling the probability distribution as determined for the first given point-in-time by an assumed transition to an expected state of the probability distribution, wherein the expected state corresponds to a state that matches the historical data.

11. The method according to claim 8, wherein the prognosis is carried out by modeling the probability distribution as determined for the first given point-in-time by an assumed transition to an expected state of the probability distribution, wherein the expected state corresponds to a state that matches the historical data.

12. The method according to claim 8, wherein the prognosis is generated by a Erlang loss queueing model.

13. The method according to claim 10, wherein the prognosis is generated by a Erlang loss queueing model.

14. A system for providing parking information regarding free parking spaces within at least one city block, comprising:

an information detecting unit configured to detect current information regarding available, free parking spaces so as to generate a knowledge database with historical data based on said detected information, wherein the historical data comprise respective statistical data regarding free parking spaces for specified city blocks and/or specified times or time periods;

a probability distribution determining unit configured to (i) fuse the historical data and current information that are available at a first given point-in-time for at least one selected city block received from vehicles that are in traffic to form fused data, (ii) update, independently from the fused data, the historical data with said current information, and (iii) determine a probability distribution of free parking spaces to be expected for the at least one selected city block based on the fused data; and a visualization generating unit configured to generate a visualization of the probability distribution that represents the parking information regarding free parking spaces within the at least one selected city block.

15. The system according to claim 14, wherein the information detecting unit comprises vehicles equipped to metrologically detect the information regarding available, free parking spaces.

16. A method for providing parking information regarding free parking spaces within at least a single city block, the method comprising the acts of:

receiving current information regarding available, free parking spaces, wherein a knowledge database with historical data is generated from the information, wherein the historical data respectively comprise statistical data regarding free parking spaces for specified city blocks and/or specified times or periods of time;

fusing the historical data and the current information at a first given point-in-time for at least one selected city block to form fused data, updating, independently from said fusing, the historical data with said current information;

determining a probability distribution of the free parking spaces to be expected for the at least one selected city block based on the fused data; and generating a visualization of the probability distribution that represents the parking information regarding free parking spaces in the at least one selected city block, wherein the current information comprises information regarding maneuvering actions by a vehicle for entering a parking space and/or maneuvering actions by a vehicle for exiting a parking space, wherein a rate of maneuvering for exiting a parking space is determined based on holding times between maneuvering for entering a parking space and maneuvering for exiting a parking space.

17. The method according to claim 16, wherein the current information further comprises information regarding a duration/rate of a search for a parking spot, in that, following the detection of a maneuvering action by a vehicle entering a parking space, location coordinates of a preceding movement of the vehicle and a respective time stamp that is assigned to the local coordinates and momentary velocities are analyzed.

* * * * *